United States Patent
Pese et al.

(10) Patent No.: US 12,395,471 B2
(45) Date of Patent: Aug. 19, 2025

(54) SUFFICIENTLY SECURE CONTROLLER AREA NETWORK

(71) Applicant: THE REGENTS OF THE UNIVERSITY OF MICHIGAN, Ann Arbor, MI (US)

(72) Inventors: Mert Dieter Pese, Howell, MI (US); Kang G. Shin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 395 days.

(21) Appl. No.: 17/959,431

(22) Filed: Oct. 4, 2022

(65) Prior Publication Data
US 2023/0106378 A1 Apr. 6, 2023

Related U.S. Application Data

(60) Provisional application No. 63/251,958, filed on Oct. 4, 2021.

(51) Int. Cl.
*H04L 9/40* (2022.01)

(52) U.S. Cl.
CPC .......... *H04L 63/0428* (2013.01); *H04L 63/02* (2013.01); *H04L 63/0876* (2013.01); *H04L 63/123* (2013.01)

(58) Field of Classification Search
CPC . H04L 63/0428; H04L 63/02; H04L 63/0876; H04L 63/123; H04L 9/0631;
(Continued)

(56) References Cited

U.S. PATENT DOCUMENTS

| 10,235,134 B1 * | 3/2019 | Dangi | G06F 7/14 |
| 2013/0139018 A1 * | 5/2013 | Takada | H04L 1/08 |
| | | | 714/748 |

(Continued)

FOREIGN PATENT DOCUMENTS

EP 3124331 B1 4/2020

OTHER PUBLICATIONS

Mahmoud Abd El-Gleel et al. "Secure Lightweight CAN Protocol Handling Message Loss for Electric Vehicles," 2021, p. 1-6 (Year: 2017).*

(Continued)

*Primary Examiner* — Luu T Pham
*Assistant Examiner* — Canh Le
(74) *Attorney, Agent, or Firm* — Harness, Dickey & Pierce, P.L.C.

(57) ABSTRACT

As automotive security concerns are rising, the Controller Area Network (CAN)—the de facto standard of in-vehicle communication protocol—has come under scrutiny due to its lack of encryption and authentication. Several vulnerabilities, such as eavesdropping, spoofing, and replay attacks, have shown that the current implementation needs to be extended. Both academic and commercial solutions for a secure CAN have been proposed, but OEMs have not yet integrated them into their products. The main reasons for this lack of adoption are their heavy use of limited computational resources in the vehicle, increased latency that can lead to missed deadlines for safety-critical messages, as well as insufficient space available in a CAN frame to include a Message Authentication Code (MAC). By making a trade-off between security and performance, this disclosure overcomes the aforementioned problems of a secure CAN.

12 Claims, 10 Drawing Sheets

(58) Field of Classification Search
CPC ..... H04L 9/0637; H04L 9/3242; H04L 12/40; H04L 12/4625; H04L 63/126; H04L 2012/40215; H04L 2209/84; H04L 12/403; H04L 12/40169; B60R 16/0315
See application file for complete search history.

(56) References Cited

U.S. PATENT DOCUMENTS

| | | | | |
|---|---|---|---|---|
| 2014/0310530 | A1* | 10/2014 | Oguma | H04L 9/32 713/181 |
| 2016/0072781 | A1* | 3/2016 | Zhang | H04L 67/1044 726/4 |
| 2017/0118020 | A1* | 4/2017 | Xu | H04L 12/66 |
| 2018/0091550 | A1* | 3/2018 | Cho | H04L 5/0055 |
| 2018/0189151 | A1* | 7/2018 | Zhang | G06F 11/1453 |
| 2019/0207915 | A1 | 7/2019 | Schaap | |
| 2019/0312892 | A1 | 10/2019 | Chung et al. | |
| 2021/0001793 | A1* | 1/2021 | Ujiie | B60R 16/0232 |
| 2021/0076356 | A1 | 3/2021 | Zhang et al. | |
| 2021/0141895 | A1* | 5/2021 | Konashi | G06F 21/552 |
| 2022/0006665 | A1* | 1/2022 | Kajuluri | H04W 4/48 |

OTHER PUBLICATIONS

Wael A. Farag, "CANTrack: Enhancing Automotive CAN Bus Security Using Intuitive Encryption Algorithms," 2017, pp. 1-5 (Year: 2017).*

Guillaume Carel et al., "Design of a Message Authentication Protocol for Can Fd Based on Chaskey Lightweight MAC", In: 2018 Sixth International Symposium on Computing and Networking Workshops (CANDARW), Dec. 27, 2018, p. 268 and Figure 1.

International Search Report and Written Opinion regarding International Application No. PCT/US2022/045661, dated Feb. 2, 2023.

* cited by examiner

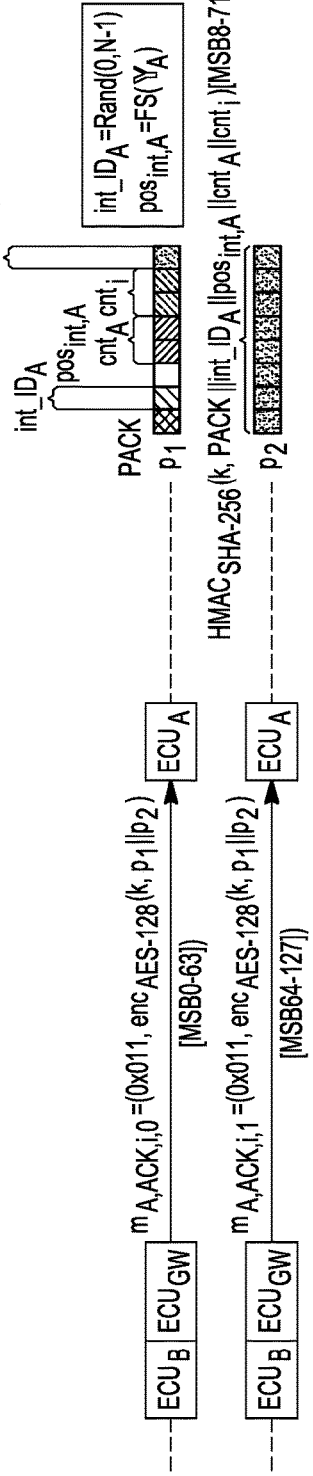
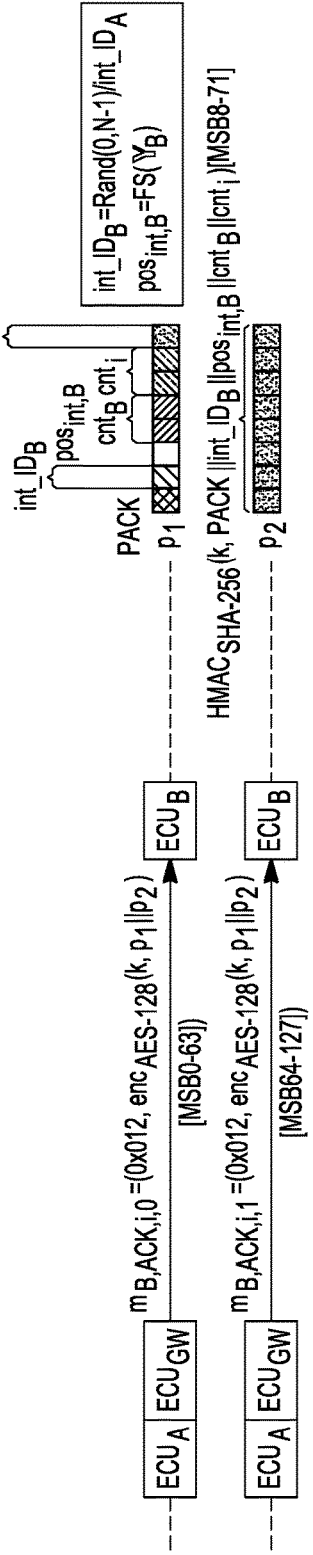
FIG. 3
| FIG. 3A |
|---|
| FIG. 3B |
FIG. 3A

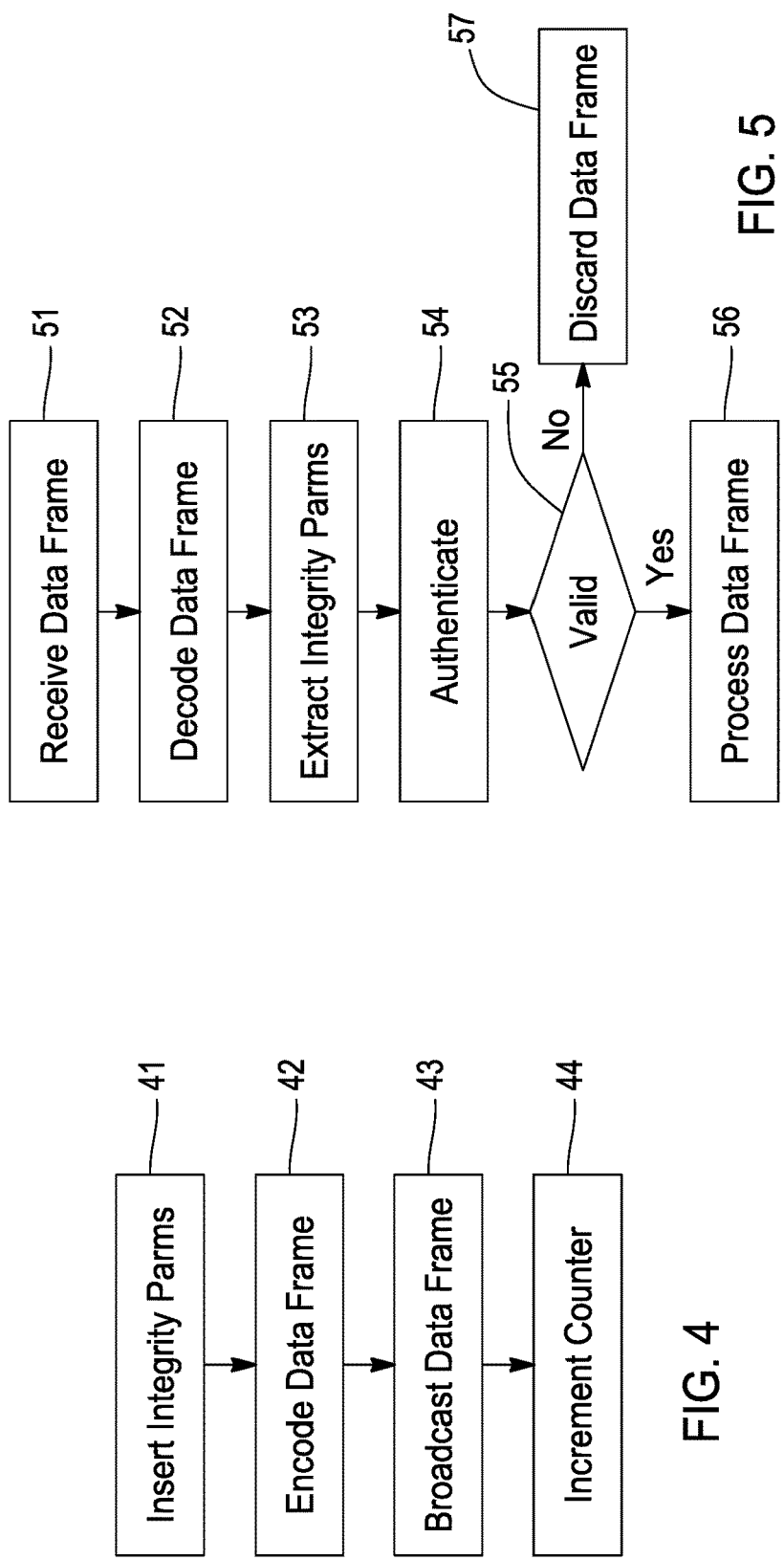

Table 1: Comparison with related approaches

| | Protection | Algorithm | HW/SW | Bus Load | Latency | MAC Length | Security Level |
|---|---|---|---|---|---|---|---|
| CaCAN [28] | Authenticity + Freshness | SHA256-HMAC | HW+SW | +100% | +2.2-3.2$\mu s$ | 1 Byte | $2^7$ |
| IA-CAN [21] | Authenticity | Randomized CAN ID + CMAC | SW | +0% | 8bit: +72ms 2bit: +150$\mu s$ | 1-4 Bytes | $2^7$-$2^{31}$ |
| vatiCAN [33] | Authenticity + Freshness | SHA3-HMAC | SW | +16.2% | +3.3ms | 8 Bytes | $2^{63}$ |
| TESLA [34] | Authenticity + Freshness | PRF+HMAC | SW | +0% | +500ms | 10 Bytes | $2^{79}$ |
| LeiA [37] | Authenticity + Freshness | MAC | SW | +100% | N/A | 8 Bytes | $2^{63}$ |
| CANAuth [41] | Authenticity + Freshness | HMAC | HW+SW | +0% | N/A | 10 Bytes | $2^{79}$ |
| S2-CAN | Confidentiality + Authenticity + Freshness | Circular Shift + Internal ID Match | SW | +0% | +75$\mu$ | N/A | ~$2^{49}$ |

FIG. 9

Table 2 : Free space in DBCs

| Veh. | Bus | #IDs | #Rebalan-cable IDs | #IDs with FS | Usable CAN IDs (%) |
|---|---|---|---|---|---|
| Veh.A | HS1 | 102 | 31 | 63 | 92.2 |
|  | HS2 | 53 | 2 | 35 | 69.8 |
| Veh.B | HS | 81 | 5 | 26 | 38.3 |
|  | MS | 62 | 3 | 16 | 30.6 |
| Veh.C | HS1 | 57 | 7 | 38 | 78.9 |
|  | HS2 | 42 | 1 | 26 | 64.3 |
| Veh.D | HS1 | 58 | 7 | 43 | 86.2 |
|  | HS2 | 51 | 4 | 38 | 86.4 |

FIG. 10

Table 3: Benchmark of other metrics

| Encr. | Auth. | BL (%) | CPUo(%) S / R | RAM(kB) S / R | Flash(kB) S / R |
|---|---|---|---|---|---|
| None | None | 0.25 | 0/0 | 1.24/1.29 | 10.1/11.96 |
|  | VatiCAN | 0.5 | 86.7/82.3 | 1.57/1.66 | 17.25/17.07 |
| AES128 | None | 0.5 | 0.8/2.0 | 1.25/1.30 | 10.30/12.02 |
|  | VatiCAN | 1 | 87.0/82.8 | 1.60/1.67 | 17.35/17.13 |
| AES256 | None | 0.5 | 1.0/2.5 | 1.27/1.31 | 10.31/12.04 |
|  | VatiCAN | 1 | 87.0/82.9 | 1.61/1.69 | 17.37/17.15 |
| 3DES | None | 0.25 | 52.8/53.5 | 1.26/1.31 | 12.27/14.22 |
|  | VatiCAN | 0.5 | 93.8/90.8 | 1.60/1.69 | 19.38/19.33 |
| TEA | None | 0.25 | 0.5/0.5 | 1.27/1.32 | 10.55/12.50 |
|  | VatiCAN | 0.5 | 86.8/82.4 | 1.60/1.69 | 17.78/17.61 |
| XOR | None | 0.25 | 0.01/0.01 | 1.25/1.30 | 10.16/12.05 |
|  | VatiCAN | 0.5 | 86.7/82.3 | 1.57/1.67 | 17.31/17.17 |
| S2 | S2 Auth | 0.25 | 0.04/0.03 | 1.25/1.30 | 10.24/12.10 |

FIG. 11

| Table 4: Cracking Success based on Trace Length (in %) | | | | | | | |
| --- | --- | --- | --- | --- | --- | --- | --- |
| Trace Length | | 5 | 10 | 25 | 50 | 75 | 100 |
| Veh. A | ST1 | 11/20 | 6/10 | 4/4 | 3/3 | 2/2 | 1/1 |
| | ID | 10/20 | 6/10 | 4/4 | 3/3 | 2/2 | 1/1 |
| | cnt | 11/20 | 6/10 | 4/4 | 3/3 | 2/2 | 1/1 |
| Veh. B | ST1 | 12/20 | 4/10 | 3/4 | 2/3 | 1/2 | 1/1 |
| | ID | 11/20 | 3/10 | 3/4 | 1/3 | 1/2 | 1/1 |
| | cnt | 12/20 | 4/10 | 3/4 | 2/3 | 1/2 | 1/1 |
| Veh. C | ST1 | 8/20 | 5/10 | 3/4 | 3/3 | 2/2 | 1/1 |
| | ID | 8/20 | 5/10 | 3/4 | 3/3 | 2/2 | 1/1 |
| | cnt | 8/20 | 5/10 | 3/4 | 3/3 | 2/2 | 1/1 |
| Veh. D | ST1 | 6/20 | 3/10 | 0/4 | 0/3 | 0/2 | 0/1 |
| | ID | 6/20 | 3/10 | 0/4 | 0/3 | 0/2 | 0/1 |
| | cnt | 6/20 | 3/10 | 0/4 | 0/3 | 0/2 | 0/1 |

FIG. 12

Table 5: Brute-Forcing Success for Top X Candidates

| TL (%) | | Top 1 | Top 2 | Top 3 | Top 5 | Top 10 |
|---|---|---|---|---|---|---|
| 5 | ST1 | 46% | 58% | 58% | 61% | 65% |
|   | ID  | 44% | 54% | 54% | 58% | 61% |
|   | cnt | 46% | 58% | 58% | 61% | 65% |
| 10 | ST1 | 45% | 68% | 68% | 73% | 78% |
|    | ID  | 43% | 58% | 58% | 63% | 68% |
|    | cnt | 45% | 68% | 68% | 73% | 78% |
| 25 | ST1 | 63% | 81% | 88% | 88% | 88% |
|    | ID  | 63% | 81% | 88% | 88% | 88% |
|    | cnt | 63% | 81% | 88% | 88% | 88% |
| 50 | ST1 | 67% | 92% | 92% | 92% | 92% |
|    | ID  | 58% | 83% | 83% | 83% | 83% |
|    | cnt | 67% | 92% | 92% | 92% | 92% |
| 75 | ST1 | 63% | 88% | 88% | 88% | 88% |
|    | ID  | 63% | 88% | 88% | 88% | 88% |
|    | cnt | 63% | 88% | 88% | 88% | 88% |
| 100 | ST1 | 75% | 100% | 100% | 100% | 100% |
|     | ID  | 75% | 100% | 100% | 100% | 100% |
|     | cnt | 75% | 100% | 100% | 100% | 100% |

FIG. 13

Table 6: Timing analysis for full traces (minutes:seconds)

|        | CAN (LibreCAN) | S2-CAN (LibreCAN+) |
|--------|---|---|
| Veh. A | 0:27 | 10:33 |
| Veh. B | 0:36 | 18:32 |
| Veh. C | 0:26 | 10:42 |
| Veh. D | 0:26 | 10:52 |

FIG. 14

SUFFICIENTLY SECURE CONTROLLER AREA NETWORK

CROSS-REFERENCE TO RELATED APPLICATIONS

This application claims the benefit of U.S. Provisional Application No. 63/251,958, filed on Oct. 4, 2022. The entire disclosure of the above application is incorporated herein by reference.

FIELD

The present disclosure relates to secure messaging in a vehicle network.

BACKGROUND

Since the advent of the first comprehensive automotive security analysis in 2010, this field has attracted significant attention. While the first generation of vehicle security (c. 2010-2015) focused on exploiting physical interfaces, such as the OBD-II port, or reverse-engineering Electronic Control Unit (ECU) firmware, the second generation (c. 2015-now) has been focusing on scaling attacks to multiple vehicles by analyzing remote attack surfaces. The most prominent and comprehensive attack of this generation that led automotive cyber security to become a mainstream research and engineering subject was the Jeep Hack that allowed the attacker to remotely compromise and steer the affected vehicles. With further scaling in each generation, the risk of automotive vulnerabilities towards driver/passenger safety and privacy, as well as financial and operational damage potential increases. All attacks in each generation have (CAN) injection/spoofing as the necessary (final) component of causing havoc in common. This enables the compromise of the vehicle which can, in the worst case, have a serious impact on driver safety, for instance, by electronically disabling the brakes or accelerating the vehicle.

Unfortunately, CAN injection is the easiest part of the aforementioned attacks. This can be explained by vulnerabilities in the CAN design which dates back to 1987. Despite allowing a fast, robust, and reliable communication, CAN was not designed with security in mind, and vehicles can no longer be regarded as closed systems due to an increased number of external interfaces with unpredictable input. CAN is a broadcast bus without encryption and authentication. Messages are sent in plain text and everyone who has access to the CAN bus can inject arbitrary messages or spoof existing ones. Encryption and authentication in a vehicle should usually go hand in hand. In order for spoofed messages to cause a visible impact on the compromised vehicle, the attacker needs to (a) know the syntax and semantics of the crafted CAN payload, and (b) be allowed to inject the targeted CAN message. In case of (a), this is only possible by reverse-engineering unencrypted CAN data traces since OEMs keep the aforementioned semantics secret instead of disclosing them publicly (security by obscurity). Recently, automated CAN reverse-engineering is shown to be achievable in a few minutes, enforcing existing attack vectors and necessitating an encrypted CAN. Finally, for case (b), authentication will prevent unauthorized entities to perform the CAN injection.

Although mechanisms such as encryption and authentication are widely used and accepted in traditional computer communication networks, their adoption in the automotive domain comes with three major problems related to performance that currently limit their deployment in commercial vehicles:

(1) Cost: For cost reasons, ECUs in an in-vehicle network (IVN) are resource-constrained. Since most safety-critical functionalities require simple computations and do not need high-performance hardware, these legacy ECUs are very simple and highly optimized for repetitive control operations. For instance, current Engine Control Modules can have 80 MHz clock frequency, 1.5 MB Flash memory and 72 kB of RAM (Bosch). Using cryptographic algorithms for encryption and/or authentication would require more performant hardware which drive up the cost for OEMs. Besides unit costs, adding security protocols to certain legacy ECUs (especially in the powertrain domain) that have been in use in cars for multiple years or even decades due to lack of necessary software improvements would increase the development cost.

(2) Latency: In order to guarantee functional safety in a vehicle, there are stringent hard real-time requirements for certain safety critical control data. The maximum permitted end-to-end (E2E) latency for cyclic control data transmitted on the CAN bus can range from a few milliseconds to a second. Since secure encryption and authentication algorithms add a non-negligible delay, as well as block CAN messages to be sent until fully encrypted (due to block size), message deadlines can be missed which can endanger driver safety.

(3) Bus Load: CAN messages contain only 8 bytes of payload. Message Authentication Codes (MACs) to protect data integrity have to be appended to the data, but due to lack of space, several existing solutions send the MAC in a separate CAN message. This increases the bus load which is an indicator for the utilization of the network. A high bus load can lead to certain CAN messages missing their (hard) deadlines, harming safety. To avoid this, the average bus load must be kept under 80% at all times.

For the above reasons, encryption and authentication on the CAN bus have not yet been adopted in commercial vehicles. Traditional cryptography-based solutions offer a medium to high level of security (see the number of combinations to brute-force MAC, labeled as Security Level, in FIG. 9) at the expense of performance (i.e., CPU, latency, bus load). These solutions are referred to herein with the generic term Secure CAN (S-CAN). Brute-forcing a MAC would take too long for in-vehicle ECUs, especially if keys are dynamically refreshed. As a result, this disclosure proposes to break away from traditional cryptography-based solutions to address the aforementioned three problems while providing reasonable, albeit relaxed security guarantees. This disclosure proposes sufficiently secure CAN (S2-CAN) messaging scheme to enable a tradeoff between performance and security to offer a feasible and secure real-world solution for the automotive industry.

This section provides background information related to the present disclosure which is not necessarily prior art.

SUMMARY

This section provides a general summary of the disclosure, and is not a comprehensive disclosure of its full scope or all of its features.

A secure method is presented for messaging in a vehicle network. The method is comprised generally of establishing a data session on the vehicle network by a given electronic control unit in the vehicle network, and broadcasting a data frame across the vehicle network by the given electronic control unit. In one embodiment, the data session is established by: receiving, by the given electronic control unit, an initialization message broadcast over a serial data link by a gateway of the vehicle network, where the initialization message includes encoding parameters for encoding data frames; storing, by the given electronic control unit, the encoding parameters in a memory of the given electronic control unit; and broadcasting, by the given electronic control unit, an acknowledgement message over the serial data link in response to receiving the initialization message, where the acknowledgement message includes integrity parameters that are associated with the given electronic control unit. A data frame is in turn broadcasted a data frame across the vehicle network by: inserting, by the given electronic control unit, the integrity parameters into payload of the data frame; encoding, by the given electronic control unit, the data frame in accordance with the encoding parameters; and transmitting, by the given electronic control unit, the encoded data frame over the serial data link.

In one aspect, the data frame is encoded by applying bit rotation to bits of the payload of the data frame in accordance with value of the encoding parameter, where the encoding parameter specifies number of bits to shift bits in the payload of the data frame. More specifically, the data frame is encoded by applying bit rotation to bits of each byte in the payload of the data frame in accordance with the encoding parameters, where the encoding parameters includes a value for each byte of the payload and each value specifies number of bits to shift bits in corresponding byte.

In another aspect, the integrity parameters is defined to include an identifier for the given electronic control unit and a position at which the identifier is inserted into the payload of the data frame. The integrity parameters may also include a counter value.

The secure messaging scheme also encompasses other electronic control units in the vehicle network. Upon receiving the acknowledgement message from the given electronic control unit; another electronic control unit extracts the integrity parameters for the given electronic control unit and stores the integrity parameters for the given electronic control unit in a memory of the another electronic control unit.

Upon receiving the encoded data frame from the given electronic control unit; the another electronic control unit reverses (or decodes) bit rotation of bits in the payload of the encoded data frame in accordance with value of the encoding parameter; extracts the integrity parameters from the payload of the encoded data frame; and authenticates the encoded data frame using the extracted integrity parameters. Authenticating the encoded data frame includes comparing the identifier for the given electronic control unit extracted from the encoded data frame with the identified of the given electronic control unit stored in the memory of the another electronic control unit. Authenticating the encoded data frame may further include comparing the counter value for the given electronic control unit extracted from the encoded data frame with the counter value of the given electronic control unit stored in the memory of the another electronic control unit, and incrementing the counter value stored in the memory of the another electronic control unit when the counter value for the given electronic control unit extracted from the encoded data frame matches the counter value of the given electronic control unit stored in the memory of the another electronic control unit.

In one embodiment, the initialization message is decrypted using a cryptographic key before extracting the encoding parameters therefrom, where the cryptographic key is shared with the gateway.

In another embodiment, the secure method is embodied is in a non-transitory computer-readable medium having computer-executable instructions that, upon execution of the instructions by a processor of a computer, cause the computer to perform the steps of claims 1-10.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a diagram of an example data frame structure for a Controller Area Network;

FIG. 2 provides an overview of the handshake phase between the gateway and the two slave ECUs.

FIG. 3 further illustrates the message content during the handshake process in an example embodiment.

FIG. 4 is a flowchart showing the step for broadcasting a data frame across the vehicle network by a given electronic control unit.

FIG. 5 is flowchart showing the steps for processing a data frame received by a recipient electronic control unit.

FIG. 9 is a table showing comparison of different messaging schemes.

FIG. 10 is a table showing the number of rebalancable and existing CAN IDs with free space.

FIG. 11 is a table showing different metrics for various encryption methods.

FIG. 12 is a table showing cracking success based on trace length.

FIG. 13 is a table showing brute-force success for top candidates.

FIG. 14 is a table showing the timing analysis for full traces.

Corresponding reference numerals indicate corresponding parts throughout the several views of the drawings.

DETAILED DESCRIPTION

Example embodiments will now be described more fully with reference to the accompanying drawings.

S2-CAN messaging scheme of tis disclosure tries to protect the confidentiality, authenticity and freshness of CAN data during operation of the vehicle without using cryptography. In particular, S2-CAN consists of two phases in its core: a handshake phase and an operation phase. In the former, it establishes unique sessions of specific length and distributes necessary session parameters to all participating ECUs. This phase resembles the key management phase in traditional S-CAN approaches where session keys are shared among the ECUs to both encrypt and authenticate CAN messages in their respective operation phase. Since S2-CAN avoids using cryptography in its operation phase, it uses the session parameters from the handshake to (a) first include a randomly generated internal ID and counter for authenticity and freshness into the CAN payload before (b) each byte of the payload is shifted cyclically by a random integer (encoding parameter) in fixed time intervals. These two steps can be compared to (a) appending a MAC to provide authenticity and (b) encrypting the plain-text CAN message to provide confidentiality in S-CAN. Compared to breaking traditional CAN authentication solutions that only require brute-forcing the MAC, the cyclic shift encoding further masks the plain-text by making it more difficult to decode and thus provides confidentiality protection as well. Due to the encoding, CAN reverse-engineering—which is the first essential step of a CAN injection attack—has to be performed in real time for the current encoding parameter and cannot be computed a priori to be used for the lifetime of the vehicle. Despite intentional weaker security of S2-CAN, a frequent update of sessions with new encoding parameters will render reverse-engineering very tedious, if not impossible. Hence, session cycle is a crucial parameter to provide security in S2-CAN. Furthermore, even after guessing the encoding correctly, an attacker would still need to calculate the internal ID and counter to bypass authentication.

Figure 1:
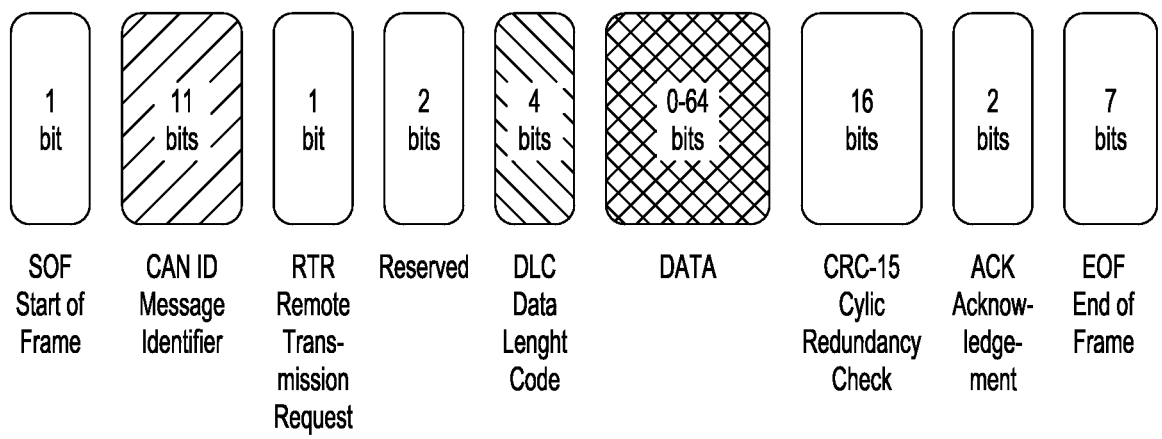

Vehicular sensor data is collected from in-vehicle ECUs. The latter are typically interconnected via an in-vehicle network (IVN), with the CAN bus being the most widely-deployed bus topology. FIG. 1 depicts the structure of the most common CAN 2.0A data frame. The three shaded fields are essential for the understanding of CAN: CAN ID, DLC and data.

CAN is a multi-master, message-based broadcast bus that is message-oriented. CAN frames do not contain any information regarding their source or destination ECUs, but instead each frame carries a unique message ID that represents its meaning and priority. Lower CAN IDs represent higher priority or criticality.

Data is the payload field of a CAN message containing the actual message data of length of 0-8 bytes depending on the value of the DLC field. The payload field consists of one or more "signals," each representing information like vehicle speed. Messages transmitted with the same CAN ID usually contain related signals. Raw CAN data is not encoded in a human-readable format and does not reflect the actual sensor values. In order to obtain the actual sensor values, raw CAN data must first be decoded. Letting $r_s$, $m_s$, $t_s$, and $d_s$ be the raw value, scale, offset, and decoded value of sensor s, respectively, the actual value can be determined as follows:

$$d_s = m_s + r_s \cdot t_s. \qquad (1)$$

All recorded CAN data can only be interpreted using the translation tables for that particular vehicle. The most common format used for this purpose is DBC which contains information about available signals in each CAN ID, their scale and offset, as well the senders and receivers of CAN messages. In order to execute a successful spoofing attack (i.e., with a visible outcome towards vehicle operation), the CAN payload has to be carefully crafted by the attacker. As a result, an adversary needs to determine the scale and offset for the CAN signal they want to spoof. Furthermore, some DBCs store if a CAN message is periodic (including its cycle time) or sporadic. Note that this disclosure only concerns modifying the CAN payload/data field and NOT the CAN ID to preserve backward-compatibility and not interfere with schedulability.

There are multiple CAN buses (e.g., powertrain, infotainment) in the vehicle that are separated via a gateway ECU. It is possible to physically tap into any CAN bus domain (after removing plastic compartments) by using an Arduino with a CAN bus shield. Another—more realistic—way of accessing the CAN bus is the on-board diagnostics (OBD-II) interface under the steering wheel which is mandatory for all gasoline cars in the US since 1996. OBDII tools are manifold and cheap. Theoretically, it is possible to read and write the CAN traffic on all in-vehicle buses through the OBD-II interface. In practice, however, not all buses are mirrored out to it. This can be explained by access control that OEMs implement. Nevertheless, previous literature has shown that CAN injection through the OBD-II port is possible in numerous cars. While reference is made throughout this disclosure to CAN, it is readily understood that the broader aspects of this disclosure are applicable to other types of vehicle networks.

The common and final part of every automotive attack—which is the main threat to protect against—is to gain access to the CAN bus for a CAN injection attack which can lead to various forms of vehicle misbehavior, including (safety-critical) sudden acceleration. In general, there are two ways an attacker can achieve CAN bus access: (a) by connecting a physical CAN device/ECU to the IVN, e.g., an OBD-II dongle or by tapping into the CAN bus, or (b) compromising an existing ECU remotely. The former is relatively easy to accomplish as long as the attacker has physical access to the target vehicle, while the latter is more complicated and multi-layered (and thus less likely) as the attacker has to usually leverage vulnerabilities in wireless interfaces of an ECU to gain access to the device. We refer to the attacker in case of (a) as an external attacker, whereas an internal attacker is capable of (b). Furthermore, the aforementioned separation of domains by a central gateway complicates a compromised ECU—which is usually on a less safety-critical bus (e.g., infotainment)—to affect more safety-critical domains such as powertrain which has no remote attack surfaces. Finally, even if a proper S-CAN approach is implemented, an internal compromise of an ECU (as in case (b)) will lead to exposure of secret keys which the attacker can use to forge the desired message's Message Authentication Code (MAC) and/or encrypt the CAN payload.

Although remote attacks on vehicles have skyrocketed over the last decade, a breakdown of attack vectors shows that most of these remote attacks are targeting key fobs, OEM servers and mobile companion apps. Remote attacks to compromise an ECU usually exploit the In-Vehicle Infotainment (IVI) and require significant effort (usually multiple months) as shown in the Jeep Cherokee hack to achieve CAN bus access and cannot be thwarted even by a properly secured CAN bus (S-CAN). In contrast, OBD-II attacks are the fourth most common attack vector and account up to over 10% of all attacks. Nevertheless, recent research has shown that remote attacks can also be launched by an external adversary by exploiting vulnerabilities in wireless OBD-II dongles. Many commercial OBD-II dongles feature Wi-Fi or Bluetooth capabilities which open a new over-the-air attack surface. The researchers' findings show that CAN injection can also be performed by remote, external attackers. As a result, external attackers in scenario (a) form the most crucial threat. In what follows, we will focus on protection from this type of adversaries and describe their attack capabilities.

Once CAN bus access has been achieved, the attacker will continue a CAN injection attack. This disclosure introduces three possible CAN injection attacks as discussed next.

Fabrication attacks allow the adversary to fabricate and inject messages with a forged CAN header and payload at a higher frequency to override cyclic CAN messages sent by legitimate ECUs that can render safety-critical receiver ECUs inoperable. Suspension attacks on the compromised ECU prevent its broadcast of legitimate, potentially safety-critical CAN messages to the intended recipient(s). Finally, masquerade attacks combine both of the above attacks by suspending the CAN broadcast of one ECU and deploying another ECU to fabricate malicious CAN messages. Only fabrication attacks can be mounted by our adversary from scenario (a), since the others require an internally compromised ECU. Fabrication attacks can not only be mounted by attackers having physical access to the car, but also by remote attackers which makes external attacks from scenario (a) an highly likely and scalable threat.

As a result, one can assume the (external) adversary to only be able to perform fabrication attacks in the threat model. Even then, the attacker can cause havoc for both vehicle and driver, as shown in the Toyota Prius hack. To prevent fabrication attacks, a solution for secure CAN must have the following two security properties: authenticity and confidentiality. Each of these properties are discussed below.

As outlined before, any CAN node can join the IVN. There is no provision of verifying the authenticity of an added malicious device to the CAN bus by default. So, device authentication is important, i.e., only pre-authorized ECUs will be allowed to communicate. Furthermore, an attacker should not be able to spoof legitimate CAN messages during a fabrication attack. This can be prevented by adding a MAC to each message to ensure integrity. The latter also includes protection against replay attacks by adding a counter to each message. The major drawback of protecting against fabrication or replay attacks is the required additional space for MACs and freshness values. This is challenging because CAN only has an 8-byte payload field, with most of the space already occupied by control data.

CAN message data is not encrypted, and therefore, messages between ECUs can be eavesdropped and analyzed by anyone accessing the IVN. To prevent this type of attack, mechanisms to guarantee confidentiality are required. As mentioned before, plaintext data can be recorded and used for reverse-engineering the proprietary CAN message format (i.e., signal location, scale and offset) which can be ultimately used to craft well-formed CAN messages in a fabrication attack to cause visible damage. Encryption with symmetric session keys between participating ECUs is a solution, although it will incur additional latency overhead.

This disclosure presents a system design comprised of three phases: key management, a handshake phase, and an operation phase. Although no cryptography will be used in the operation phase, establishing a session $S_i$ during the handshake phase needs the distribution of keys which will be briefly discussed below. For illustration purposes, the vehicle network is comprised of two slave ECUs and one master ECU which is the central gateway. The master ECU will be responsible for establishing new sessions during the handshake phase. There is no real value of expanding the testbed to more than two slave ECUs since the benchmark below shows that S2-CAN does not add any communication overhead and is thus independent of traffic/bus load during the operation phase, i.e., when operation-related CAN messages are exchanged between ECUs. S2-CAN is applied to each CAN sub-bus independently. As a result, the OEM can choose which CAN buses to protect. The syntax used is as follows: m=(CAN_ID, Payload) for a CAN message m exchanged on the bus. Furthermore, a logical ordering of the slave ECUs is required for error handling and timeout purposes during the handshake phase, i.e., that $ECU_A$ transmits before $ECU_B$. The ordering can be assigned randomly (as in this case) or according to criticality/relevance of the ECU, with the more safety-critical slave ECU being assigned as $ECU_A$. This knowledge of ordering can be stored as an additional one-byte unsigned integer in each ECU's non-volatile memory.

S2-CAN refrains from using Message Authentication Codes (MACs) and encryption based on cryptographic keys during the vehicle's operation mode. During the handshake phase, S2-CAN-specific session parameters are distributed from the master ECU (gateway $ECU_{GW}$) to the two slaves $ECU_A$ and $ECU_B$ on a safety-critical CAN domain named $CAN_1$. These session parameters establish a new S2-CAN session $S_i$ that is valid for a Session Cycle T. To distribute these parameters securely in each session, cryptography is used during the handshake phase. This requires the existence of pre-shared secret keys that are provided by the key management system in a vehicle. Since a detailed discussion of key management is not in the scope of this disclosure, symmetric keys are pre-installed on each ECU. It is understood that different known techniques for distributing key can be used. Nevertheless, the use of short-lived session keys is recommended to limit exposure of the long-term key which would allow eavesdropping attacks on the handshake and thus fully compromise S2-CAN.

Upon initialization, $ECU_{GW}$, $ECU_A$ and $ECU_B$ on $CAN_1$ will perform a 3-way handshake in order to exchange the information about the aforementioned session parameters and agree on "talking" in S2-CAN syntax. In an example embodiment, the session parameters consist of a global (a) encoding parameter f, (b) a slave ECU-specific integrity parameter $int\_ID_j$, (c) a slave ECU-specific integrity parameter $posint_j$, and (d) a slave ECU-specific counter value $cnt_j$, with j denoting the respective slave ECU. Parameter (a) will be distributed in Stage 1, whereas the other three parameters (b)-(d) will be exchanged between ECUs in Stage 2. The handshake comprises three stages and repeats for each new session $S_i$ in periodic fixed-intervals T which represents the session cycle.

Figure 2:
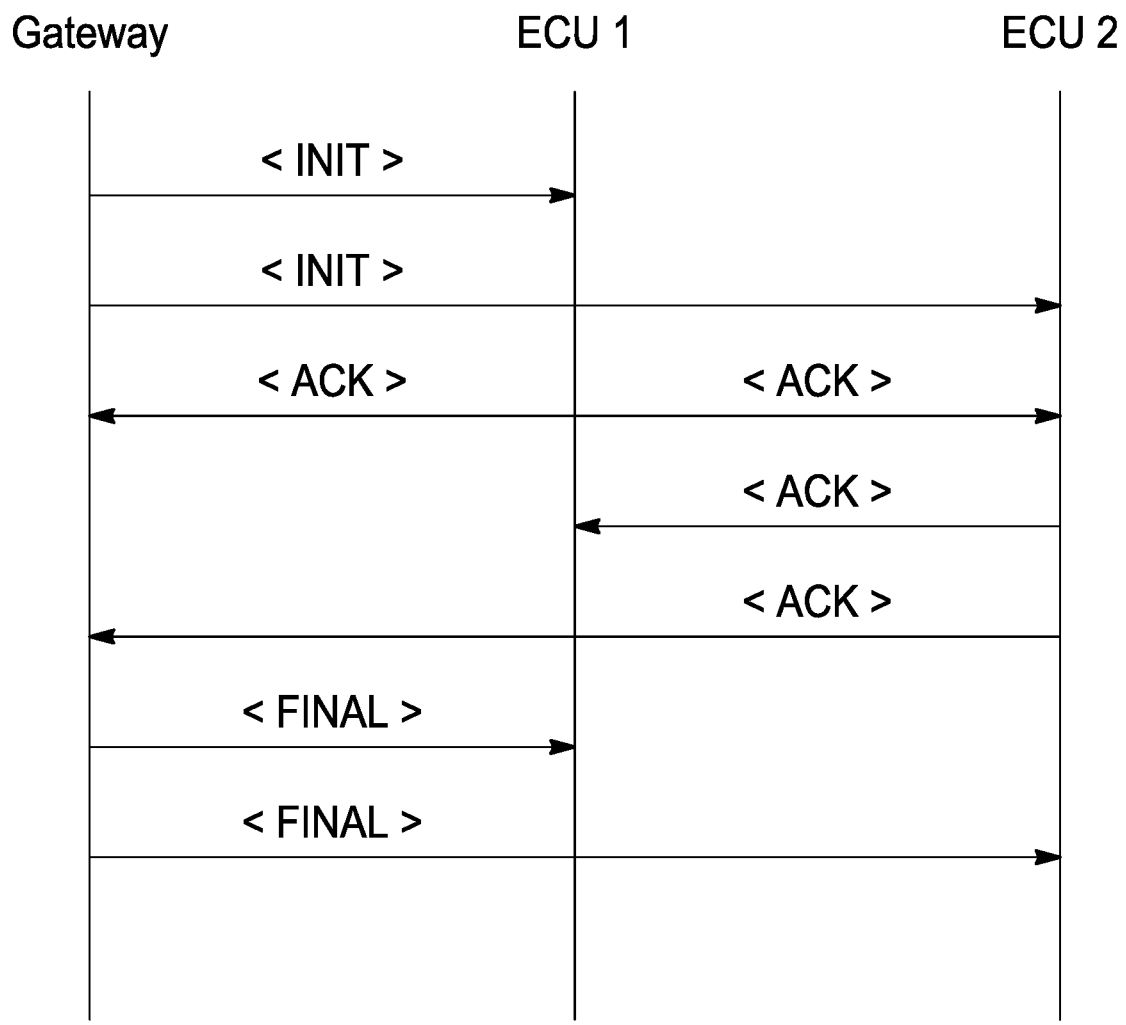

FIG. 2 provides an overview of the handshake phase between the gateway and the two slave ECUs. The gateway starts a new session by broadcasting an initialization message over the serial data link of the vehicle network. The initialization message includes the session parameters noted above.

Upon receipt of the initialization message, each slave ECU is configured to store the session parameters in a memory of the ECU. In response to receiving the initialization message, each slave ECU will also broadcast an acknowledgement message over the vehicle network. The acknowledgement message includes integrity parameters that are associated with the ECU. Lastly, the gateway finalizes the handshake phase after receiving the acknowledgement message from all of the slave ECUs. To do so, a finalization message is sent from the gateway to the slave ECUs. While some of the messages are shown as being sequential, it is understood that these messages may be broadcast concurrently in some vehicle networks.

FIG. 3 further illustrates the message content during the handshake process in an example embodiment. In this example, the handshake process is described for an arbitrary session $S_i$. The communication diagram for handshake phase is separated into the three stages. The CAN IDs used for messages during the handshake are merely examples, but should have a low ID or high priority.

Stage 1 (Initialization): The master ECU ($ECU_{GW}$) indicates that it wants to start a new session $S_i$. It randomly generates an 8-byte encoding parameter $f_0=(r_0, r_1, r_2, r_3, r_4, r_5, r_6, r_7)$, $r_1 \in [0, 7]$. $r_l$ corresponds to the bit rotation number for the $l^{th}$ byte in the 8-byte CAN payload. Each $r_i$ can be expressed with 3 bits for a total of 3 bytes to include in the payload p of the gateway initialization message $m_{GW,init}$= (0x010, p). As discussed before, due to the sensitivity of handshake messages, each CAN message during the handshake has to be both authenticated and encrypted to prevent spoofing and eavesdropping, but also replay attacks. To achieve the latter, first add a 2-byte counter $cnt_0$ (not to be confused with the ECU-specific session parameter $cnt_x$) to defend against replay attacks. In order to prevent spoofing attacks on this message, calculate the SHA256-HMAC of the previous 5 bytes (i.e., $f_i$ and $cnt_i$) to obtain a 32-byte output with the symmetric key k from Phase 0. Since the payload of $m_{GW,init,i}$ only has another 3 bytes of free space to fit the MAC which would be too small to defend against brute-force attacks, we have to truncate the HMAC (taking the MSBs per definition). The truncation can be done safely since the increased advantage of the attacker would be offset by the limited availability of a CAN message due to the cyclic message nature of CAN and the invalidation through the counter value $cnt_i$. Nevertheless, three bytes for a truncated HMAC is too small. As a result, this example splits $m_{GW,init,i}$ into two consecutive CAN messages $m_{GW,init,i,0}$ and $m_{GW,init,i,1}$ with respective payloads $p_1$ and $p_2$ to (a) utilize another 8 bytes for the truncated HMAC, resulting to a total of 11 bytes, and (b) allow encryption with a secure block cipher such as AES-128 which has a block size of 16 bytes. In summary, two CAN messages with the following syntax are broadcast sequentially on CAN1:

$$m_{GW,init,i,0}=(0x010, enc_{AES128}(k, p1 \| p2)) \qquad [\text{MSB0-63}])$$

$$m_{GW,init,i,1}=(0x010, enc_{AES128}(k, p1 \| p2)) \qquad [\text{MSB64-127}])$$

Stage 2 (Acknowledgment): Upon receiving both initialization messages from $ECU_{GW}$, $ECU_A$ and $ECU_B$ first decrypt the ciphertexts p1 $p_1$ and $p_2$ using the symmetric key k and extract the encoding parameter $f_i$ into local memory. Each slave ECU will then broadcast an acknowledgment (ACK) message $m_{j,ACK,i}$ (which will be split into two messages again due to AES-128 encryption), where $j \in [0, \ldots, N-1]$, consisting of a 1-byte positive acknowledgment code (PACK) and the three slave ECU-specific parameters (b)-(d) in the CAN payload. Parameter (b) is a randomly generated unique internal ID $int\_ID_j \in [0, N-1]$ representing ECU; on $CAN_1$ during the current session $S_i$. This parameter can be encoded with 1 byte since a CAN domain (or even vehicle in general) never has more than 256 ECUs.

Next, parameter (c) specifies the random position $pos_{int,j}$ of where the internal ID (parameter (a)) will be located within the CAN payload. Since space within the payload is limited and specific positions are occupied by CAN signal data that cannot be overwritten, the internal ID has to be included in available free space. The set of available free spaces for a CAN ID in a given vehicle is defined as $Y_j$. Below discusses the distribution of free spaces among CAN IDs by analyzing the DBCs of 4 different vehicles. For instance, $Y_j=12, 13, 14, 25, 26, 54, 55, 63$ states that the CAN ID belonging to ECUj possesses only 8 bits of free space over 4 non-consecutive "regions". This set of bits is then used by the Free Space (FS) function to randomly determine the first bit $pos_{int,j}$ where $int\_ID_j$ will be placed:

$$pos_{int,j}=FS(Y_j) \qquad (2)$$

In this example, if $pos_{int,j}=54$, the MSB of the one-byte internal ID will be stored at bit position 54 and the LSB at bit position 26.

The last parameter (d) is the initial value of an ECU-specific counter $cnt_j$ for replay protection and is also randomly generated. This parameter consists of 2 bytes and is also included in available free space together with $int\_ID_j$ by Eq. 2.

Besides including these functional handshake parameters, the ACK messages will also include a 2-byte handshake counter $cnt_i$ and truncated HMAC for integrity and freshness protection, just like in Stage 1. Obtain 2 consecutive CAN messages broadcast by $ECU_j$ that are both authenticated and encrypted with the following syntax:

$$m_{A,ACK,i,0}=(ID_j, enc_{AES128}(k, p1 \| p2)) \qquad [\text{MSB0-63}])$$

$$m_{A,ACK,i,1}=(ID_j, enc_{AES128}(k, p1 \| p2)) \qquad [\text{MSB64-127}])$$

Due to the aforementioned pre-determined order for all slave ECUs, $ECU_A$ will first transmit with CAN ID 0x011 and $ECU_B$ needs to wait until it has received both $m_{A,ACK,i,0}$ and $m_{A,ACK,i,1}$ from ECUA before it can broadcast $m_{B,ACK,i,0}$ and $m_{B,ACK,i,1}$. For the latter two messages, the CAN ID can simply be incremented by one as depicted in FIG. 3, as each ECU will use a distinct CAN ID. Once $ECU_B$ receives the aforementioned ACK message, it first extracts the received integrity parameters into its memory and then repeats the ACK process for itself. To avoid collisions in internal ID assignment, it needs to exclude $int\_ID_A$ during the random ID generation.

Stage 3 (Finalization): $ECU_{GW}$ finalizes the handshake after receiving ACKs from all slave ECUs. It sends $m_{GW,fin,i}$ with a random non-zero payload to signal that it has received well-formed ACK messages from all slave ECUs and monitored a successful handshake. The finalization message is again split into two CAN messages and broadcast with CAN ID 0x020.

Due to authentication, an adversary cannot spoof the contents of a handshake message. An attacker cannot replay handshake messages due to the freshness counter, and eavesdropping attacks can be mitigated by encryption. If any ACK message takes too long due to bus or ECU errors, the handshake times out and $ECU_{GW}$ restarts the handshake with Stage 1. If the handshake is still unsuccessful even after repeating it r times, all ECUs on $CAN_1$ can revert to regular CAN communication until the next start of the vehicle. Although this countermeasure has been designed for non-adversarial reliability issues, an adversary still cannot exploit it. An attacker could launch a Denial-of-Service (DoS) attack through the OBD-II device by injecting high-priority CAN IDs (e.g., 0x0) with the goal to circumvent successful handshakes and downgrade to regular CAN communication. Since vehicles have a holistic security concept in place, the gateway (which is directly connected to the OBD-II port) can defend against this availability attack by discarding injected CAN messages under a certain CAN ID threshold, i.e., the lowest handshake CAN ID.

After the handshake for a session $S_i$ has been completed, slave ECUs can start the operation phase of exchanging regular data on $CAN_1$. An overview of broadcasting a data frame across the vehicle network by a given electronic control unit is shown in FIG. 4. First, the given electronic control unit inserts the integrity parameters into the payload of the data frame as indicated at 41. In the example embodiment and to save space in the CAN payload field, the following operation can be performed on the 1-byte int_IDj and 2-byte [[cnt]]_j that [[ECU]]_j stored during the handshake to calculate the 2-byte parameter qj:

$$qj = \text{LEFTZEROPAD}(int\_IDj, 8) \oplus [\![cnt]\!]\_j. \quad (3)$$

The payload of a CAN message is being logically ORed with qj which includes the integrity parameters into the free space of a CAN message.

The data frame is then encoded at 42 in accordance with the encoding parameters. In one embodiment, bit rotation is applied to the bits of the payload in accordance with the value of the encoding parameters, where the encoding parameter specifies the number of bits to shift bits in the payload of the data frame. For example, a Circular Shift (CS) operation may be performed on the new payload using the stored encoding parameter $f_i$ which does a byte-wise bit rotation to the lth byte according to the value of the lth element of fi. Other encoding method are also contemplated by this disclosure.

Finally, the message is broadcast at 43 on the vehicle network $CAN_1$. For the next CAN message sent by $ECU_j$, its local counter will be incremented at 44. It is to be understood that only the relevant steps of the methodology are discussed in relation to FIG. 4, but that other software-implemented instructions may be needed to control and manage the overall operation of the system.

On the receiver side, the recipient ECUs reverse the process as seen in FIG. 5. Upon receiving a data frame at 51, the recipient ECU decodes the data frame as indicated at 52. In the example embodiment, the ECU reverses the bit rotation of bits in the payload in accordance with the value of the encoding parameters. Continuing the example above, the ECU rotate each byte of the encrypted payload in the opposite direction according to $r_j$. The integrity parameters are then extracted at 53 from the payload of the data frame. In the example embodiment, the position information is extracted from $pos_{int,j}$, the internal ID is determined and the counter/freshness value is obtained by XORing it with $int\_ID_j$ of the sender.

Based on these extracted values, the recipient ECU can authenticate the data frame as indicated at 54. In the example embodiment, the extracted counter $cnt_j$ is compared with the expected counter for the respective sender. If the two values match, the local counter for sender $ECU_j$ on the receiver is incremented, and the internal ID of the sender $int\_ID_j$ is compared with the stored internal ID for the respective sender on the receiver ECU. Only if these two checks do not fail, the recipient ECU can assume that the message came from a legitimate sender $ECU_j$ and start processing the data in the payload as indicated at 56. Otherwise, it may either suspect a replay attack or a message with fabricated information from a malicious ECU and drop the CAN message as indicated at 57. The operation mode with the respective encoding and integrity parameters ends once a new handshake has been completed. A new session $S_{i+1}$ begins. The operation mode does not get interrupted by the start of a new handshake to guarantee functionality and safety.

Finally, what happens in the case of packet drops that can happen naturally on the CAN bus. Since each CAN message has a counter to prevent replay attacks and the receiver expects the next message with an incremented counter value, a packet drop can lead to inconsistencies with the local state counter on the receiver side. In order to account for packet drops, the receiver ECU will still accept CAN messages with counter values higher than the previous message within a specific threshold. The latter depends on the packet loss rate on the CAN bus which is usually very robust.

To gain a better understanding of how many signals are used in a CAN ID and thus how much of free space (FS) is available to include our integrity parameters $int\_ID$; and $cnt_j$, this disclosure analyzed the DBC files of four passenger vehicles from a North American OEM under NDA. Since we include a 2-byte parameter $q_i$ into the CAN payload, only a maximum of 6 bytes may be used for data. Among all CAN IDs in each DBC, we identified certain low priority non-operation-related CAN IDs that do not occur during regular operation of the vehicle. Hence, we manually removed these irrelevant CAN IDs for our purposes and analyzed the remaining operation-related CAN IDs for available unused space.

Figure 6:
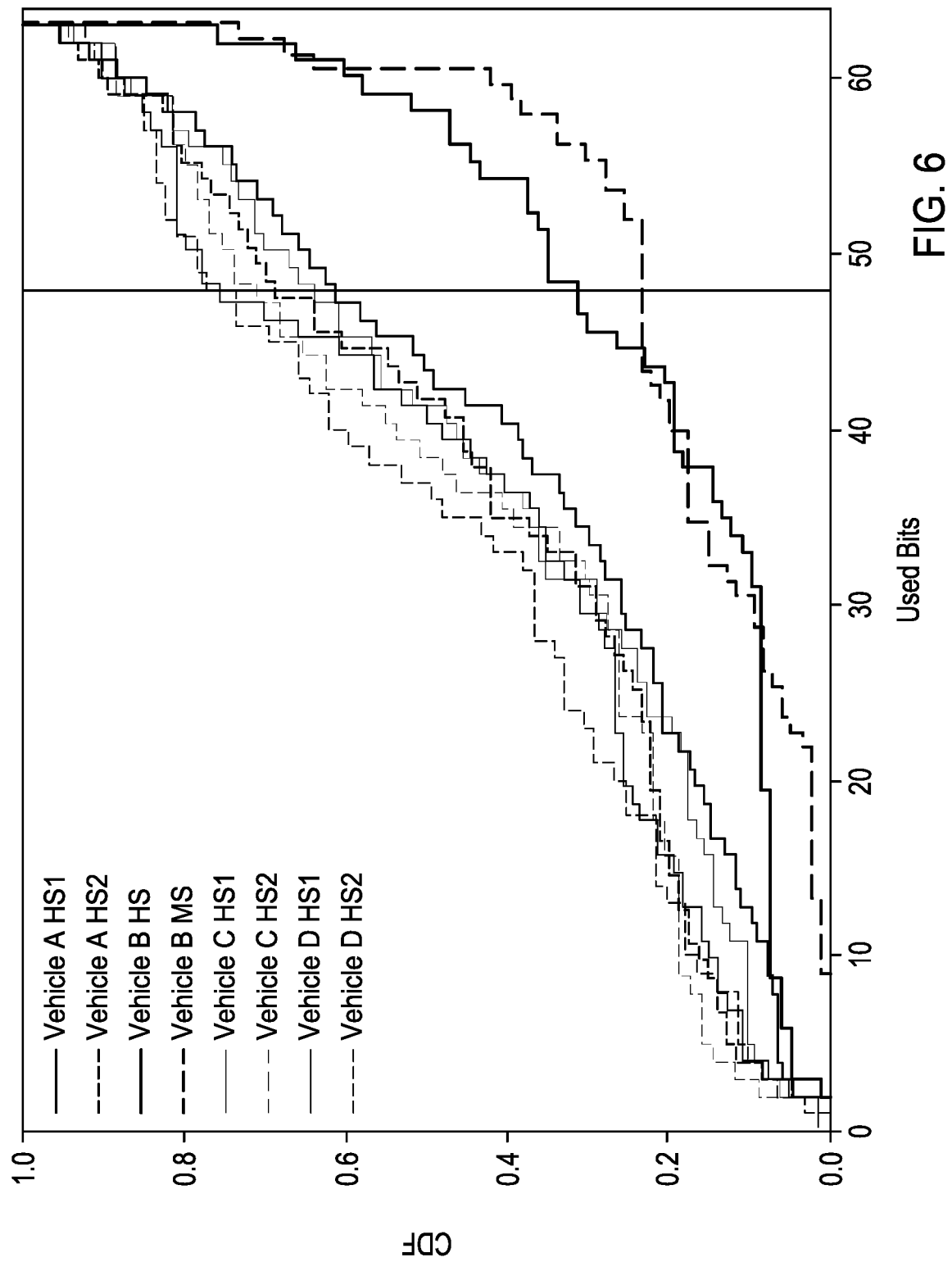
FIG. 6 is a graph showing the cumulative distribution function of used bits for different vehicles.

A Cumulative Distribution Function (CDF) for each vehicle is plotted in FIG. 6. The vertical marker indicates that all vehicles—with the exception of Vehicle B—contain between 60% and 80% CAN IDs that have at least 16 bits of free space. As a result, one can apply S2-CAN for the majority of CAN IDs, but would like to analyze how to further improve this metric to maximize the number of usable CAN IDs. These results are referring to the free space in the CAN payload/data field and not the CAN ID field.

OEMs could re-balance the disparity of available space in a CAN message with a more careful design of the CAN communication matrix while still considering functional requirements. In what follows, this disclosure presents a possible re-balancing approach. CAN messages are differentiated by four types: fixed-periodic, event-periodic, event-on-change and network management. First, CAN IDs are grouped based on the sender ECU. As mentioned before, a sender can transmit multiple CAN IDs with different cycle times if the CAN ID is fixed-periodic or event-periodic. The latter message type is similar to fixed-periodic except a CAN message is not necessarily transmitted at every cycle time. Both message types cannot be grouped together.

Figure 7:
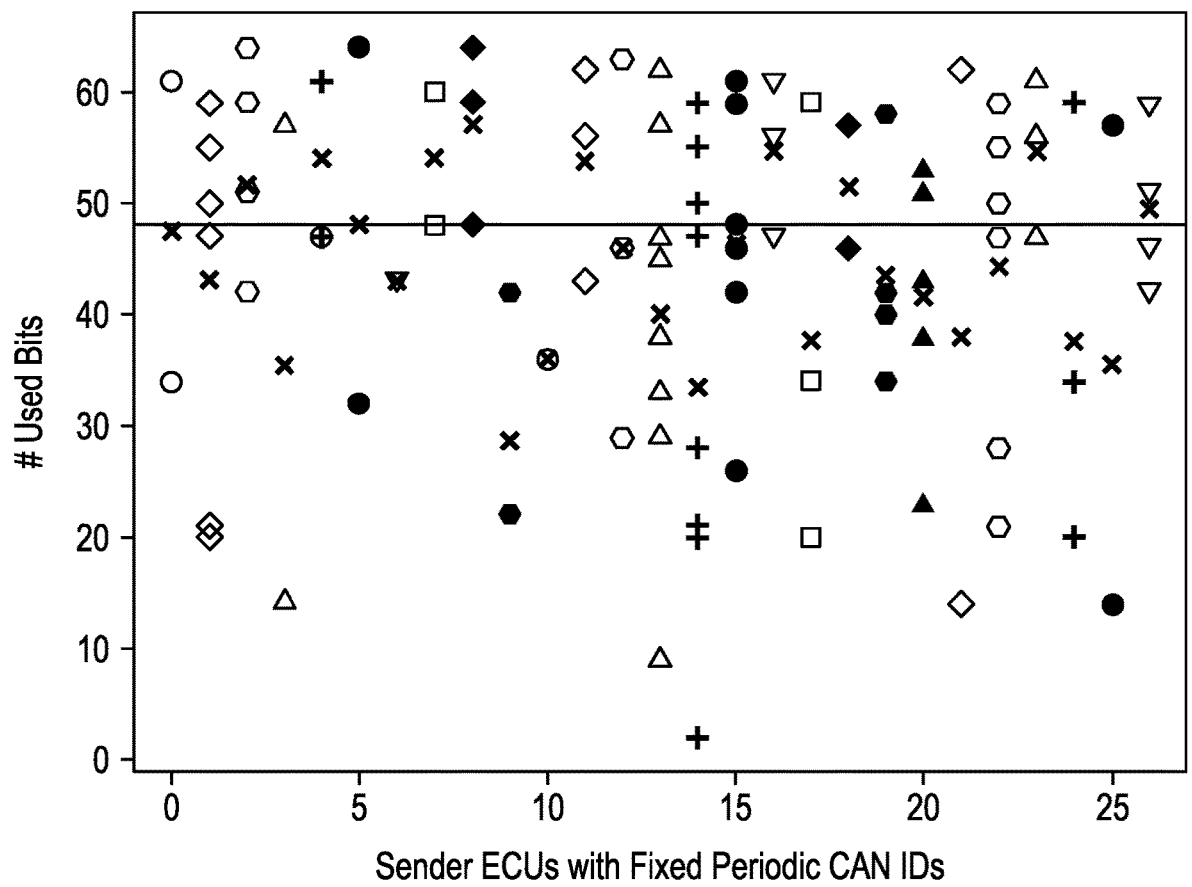
FIG. 7 is a graph showing the number of used bits of fixed-periodic CAN messages with exactly the same cycle time.

As an example, FIG. 7 depicts the number of used bits of fixed periodic CAN messages with exactly the same cycle time that a sender ECU transmits on HS1-CAN (high-speed CAN 1) of Vehicle A. Points above the threshold line of 48 bits depict CAN IDs that do not have sufficient free space for S2-CAN. Since all vertical dots are grouped by sender ECU and cycle time, they can be re-balanced by packing signals of their mean value per CAN ID (depicted with marker x). For vehicle A HS1, there are a total of 101 fixed-periodic CAN IDs. A mean value below 48 bits indicates that the CAN IDs in the group can be re-balanced. 27 CAN IDs can be re-balanced this way, besides those already under this threshold. This experiment is repeated for all other vehicles and buses for both fixed-periodic and event-periodic messages. The number of rebalancable and existing CAN IDs with free space are summarized in FIG. 10. The sum of these two yields the number of usable CAN IDs for S2-CAN. With the exception of Vehicle. B, around 79-92% of all CAN IDs can be used with S2-CAN for the more safety-critical HS1-CAN. The remaining non-periodic CAN IDs can be re-balanced further by OEMs based on functionality. Finally, no relationship between message priority and free space can be derived.

For an experimental setup, a prototype was built with three CAN nodes, each of which consists of an Arduino Mega 2560 board and a SeeedStudio CAN shield. This prototype was set up to operate at a 500 kBit/s baud rate as in a typical high-speed safety-critical CAN bus. Note that the entire evaluation is based on a simple scenario with the sender ECU transmitting only one CAN message. In reality, multiple CAN messages will be broadcast on the CAN bus in a relatively short time and CAN scheduling will pick the highest-priority CAN message to be broadcast first. This will inherently lead to blocking time $t_b$ for lower-priority messages which depends on the number of higher priority messages that have to be transmitted first. Nevertheless, using a simpler setup does not affect the evaluation metrics except the operation latency which is discussed below.

Since we want to compare the performance of S2-CAN with prior work, existing CAN bus encryption methods are implemented with vatiCAN for authentication. VatiCAN was chosen among various existing SW-only CAN authentication approaches due to its decent performance for both latency and bus load, as well as existing and well-documented Arduino implementation. Details regarding vatiCAN can be found in "Vatican-vetted authenticated CAN bus" In International Conference on Cryptographic Hardware and Embedded Systems which is incorporated herein by reference.

The time it took to complete a handshake while varying the number of slave ECUs in a CAN domain was measured. The handshake process is repeated every T. The old session still continues with the existing parameters until the handshake is completed. As a result, no critical message exchange during the operation mode of the previous session is interrupted. The handshake of the new session will be executed in parallel with the operation of the previous session. The only critical time when the handshake latency can affect operations of the car is during the initial start-up of the car since a session $S_0$ of S2-CAN cannot start until the initial handshake has been completed. A varying number of slave ECUs were simulated by having the two prototype ECUs take turns to send ACK of the handshake, in a ping-pong manner. The DBCs of four vehicles were surveyed to find that each CAN bus has 9-23 different ECUs. So, in this simulation, a maximum of 25 slave ECUs were considered. For two slave ECUs, the average total handshake time stands at 303 ms, for five at 529 ms, for ten at 907 ms and for the maximum number of 25 slave ECUs, one can achieve around 2 seconds of handshake latency $t_{hs}$, i.e., the car starts talking S2-CAN after $2s$ when it is powered on. These calculations also show that each additional slave ECU on the bus will add an average of 75.5 ms towards the latency. Furthermore, the handshake process will be started at $P \cdot T - t_{hs} - Q \cdot t_b$ before the current session expires to provide a smooth transition to the next session. P denotes the session number and Q the average number of higher-priority CAN messages that can be expected to cause the blocking of handshake messages.

CAN messages have stringent deadlines, i.e., when they must arrive at the receiver. Modern HS-CAN buses have minimum cycle times (and thus deadlines) of 10 ms, as a manual inspection of the four DBCs also confirmed. Latency measurements are averaged from a sample of 1000 messages sent over 100 seconds, or one message every 100 ms. The E2E latency $t_{E2E}$ was calculated for
(1) Regular CAN with vatiCAN authentication ("NONE"),
(2) 3 DES, TEA, XOR, AES-128 and AES-256 encrypted CAN with vatiCAN authentication,
(3) and finally S2-CAN.

In the first case, E2E latency consists of processing delays of the sender and receiver, the time to calculate the MAC on the sender and check the MAC on the receiver, as well as the CAN bus network latency. In the second case, encryption/decryption latencies are added on the respective sides. S2-CAN uses the latter calculation methodology as well, while the MAC and encryption/decryption latencies are replaced by the delay to calculate/check the internal ID and counter, and encode/decode through Circular Shift (CS).

Figure 8:
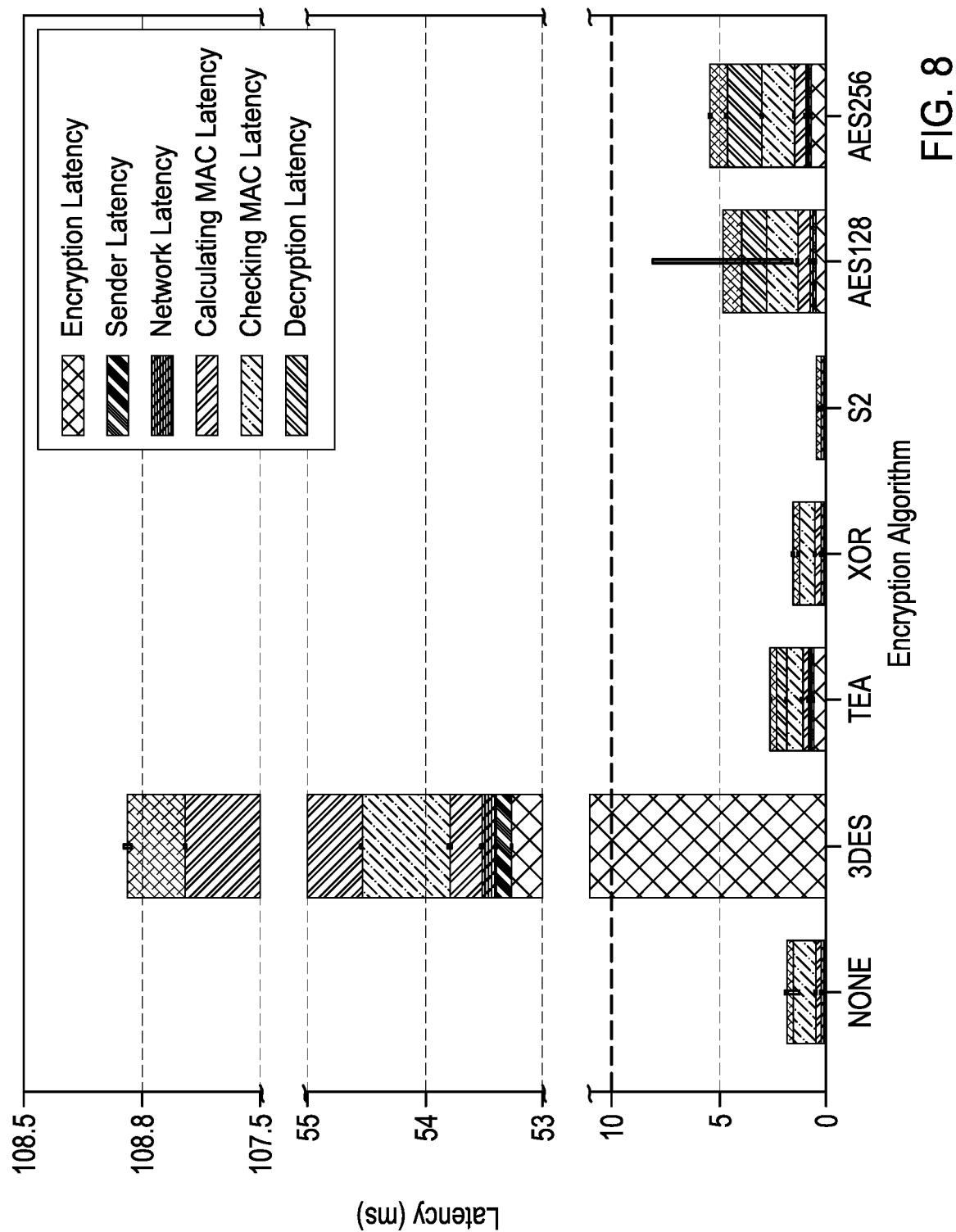
FIG. 8 is a graph showing the latency for different encryption algorithms.

FIG. 8 depicts the breakdown of the E2E latency for all three aforementioned cases. Furthermore, the dotted horizontal line indicates the aforementioned deadline of 10 ms. It can be easily seen that the encryption/decryption of 3 DES takes much longer on Arduinos than other encryption algorithms that can still satisfy the 10 ms deadline. Tiny Encryption Algorithm (TEA) and XOR seem to satisfy it although they are not considered secure and are thus not recommended to be used in production. Furthermore, in all experiments, no additional traffic was included, so that the reported E2E latencies assume no blocking time due to higher-priority CAN messages and can be considered a lower bound. Hence, even AES-128 and AES-256 are likely to miss the 10 ms deadline if they lose the CAN arbitration to a message with lower ID. S2-CAN with $t_{E2E}=414$ μs satisfies both deadlines and only adds an overhead of 75 μs to the E2E latency of a regular CAN message (i.e., no encryption or authentication).

Latency numbers for MAC operations by vatiCAN are lower in FIG. 8 than the reported 3.3 ms from FIG. 9. A sponge capacity of c=8 is used instead of the original, more secure c=128 to provide a lower bound for vatiCAN's latency overhead.

Besides the E2E latency, bus load, CPU overhead, and memory usage were measured for each encryption method with and without vatiCAN authentication. The results are summarized in FIG. 11. The metrics are calculated for messages exchanged during Operation Mode, unless noted otherwise.

The bus load (BL) b is calculated as follows:

$$b = \frac{s_{frame}}{f_{baud}} \sum_{m \in M} \frac{1}{Pm}, \quad (4)$$

where fbaud=500 kBit/s is used as baud rate on the CAN bus, and pm is used as the period/cycle time of message m, and assuming each CAN frame uses 125 bits, sf rame=125. With regular CAN (no encryption and authentication), send one message every pm. AES has a block size of 16 bytes and the maximum size of the payload is 8 bytes. Thus, send two consecutive messages, each with a period of $p_m$. With vatiCAN authentication, an additional MAC is sent after each message, effectively doubling the bus load. FIG. 11 shows that only S2-CAN does not add any overhead to the bus load of regular CAN during operation mode, but provides protections against both confidentiality and integrity. Note that the bus load does increase during each handshake due to additional 2(N+2) exchanged messages. Nevertheless, the handshake adds an overhead of merely 2.5% to the bus load.

CPU overhead (CPUo) cy of $ECU_y$ is calculated by measuring how many idle cycles pass per message. Establish regular CAN to be the baseline, then calculate overhead cy for y∈{Sender,Receiver} as follows:

$$c_y = 1 - \frac{cycles_{idle}}{cycles_{baselines}}. \quad (5)$$

With reference to FIG. 11, one sees that vatiCAN authentication accounts for the largest CPU overhead (with the exception of 3 DES). The CPU utilization on each ECU almost doubles. With S2-CAN, there is a negligible CPU overhead that demonstrates the lightness of this approach on computational resources.

Finally, Flash and RAM usage are reported when the code compiles to the Arduinos. No dynamic memory is used. All approaches except S2-CAN add up to 30% more RAM and 70-90% of Flash usage compared to the memory consumption for regular CAN. The memory consumption (both RAM and Flash) for S2-CAN is minimal.

To measure the security level of S2-CAN, one needs to determine the time an attacker requires to correctly spoof a specific CAN message. To be more concrete, assume the adversary will try to accelerate the vehicle by CAN injection through the OBD-II port. Furthermore, assume that the gateway blocks CAN messages with IDs under a certain threshold to secure the handshake and no intrusion detection system is installed in the target vehicle. Given the current state of commercial passenger vehicle security, this is a very likely scenario. In order to affect the acceleration behavior by CAN message injection, the adversary needs to know the message format (i.e., CAN ID, signal position, scale and offset) of the signal they want to spoof. For regular CAN, this is possible by existing automated CAN bus reverse-engineering tools such as LibreCAN. In the following security analysis, Phases 0 and 1 of LibreCAN are deployed with some modifications to adapt to S2-CAN and try to measure the time an attacker would need to determine the correct payload to inject into the CAN bus. The modified attack tool is called LibreCAN+, consisting of three stages that are discussed below.

All experiments were conducted using Python 3 on a computer running 64-bit Ubuntu 18.04.4 LTS with 128 GB of registered ECC DDR4 RAM and two Intel Xeon E5-2683 V4 CPUs (2.1 GHz with 16 cores/32 threads each). The security of S2-CAN was evaluated by using one-hour real-world traces collected from four recent (2016-2019) vehicles: Vehicle. A is a luxury mid-size sedan, Vehicle B a compact crossover SUV, Vehicle C a full-size crossover SUV and Vehicle D a fullsize pickup truck. Vehicles A, C and D have at least two HS-CAN buses, both of which are routed out to the OBD-II connector, whereas Vehicle B has at least one HS-CAN and one MS-CAN, with only the former being accessible via OBD-II. All raw CAN data was collected with the OpenXC VI.

The recorded traces from these four evaluation vehicles are in regular CAN-syntax. To enable S2-CAN-compliant communication, the one-hour traces are processed according to simulated handshake parameters and converted into S2-CAN-syntax. First, analyze the DBC file of the vehicle to determine the ECU nodes that are present in the network, free space of each CAN ID payload, and group CAN IDs based on the node that emits them since the handshake assigns the parameters on a per-node basis. Then, randomly assign each node a unique internal ID$\in [0, N_{ECU}-1]$. The counter of each node is also initialized to a random number in range $[0, 2^{16}-1]$. Third, assign incrementing counter values for each CAN message. After specifying values for the internal ID and counter of each CAN message, XOR the two values to obtain $q_j$, assign it to a free space in each CAN message (if possible) and finally OR it with the original payload. In order to be compliant with S2-CAN, the payload needs to have at least 2 bytes of free space, but these do not have to be contiguous. CAN IDs are removed from the trace that do not have the necessary free space. Finally, perform the byte-wise circular shift (CS) on each remaining message according to the randomly generated encoding parameter f.

First, the adversary can assume that the targeted CAN signal is two bytes or less in size since this applies to most powertrain-related signals. In all four vehicles the target signal is 13 bits long. Next, the attacker can brute-force the CAN trace with each possible encoding for each of the 7 pairs of contiguous bytes in the CAN message. The encoding scheme has 8 possibilities for each byte, so without accounting for duplicates, there are 8·8·7=448 combinations an attacker must try. However, because encodings for unconsidered bytes are set to zero, one can reduce this to 400 combinations by eliminating duplicates: One combination of all zeros, 7·8=56 combinations where all but one byte are zero, and 7·7·7=343 combinations where all but two contiguous bytes are zero. For each potential encoding, the attacker decodes the trace and runs it through Phases 0 and 1 of the original LibreCAN, resulting in a list of three-tuples (candidate CAN ID, encoding, normalized crosscorrelation score). The pairs with the highest X correlation scores can then be used in Stage 2. Note that multi-threading is used in this stage to calculate up to 50 combinations simultaneously.

For the adversary to successfully spoof a message, they must be able to increment the message counter to the correct value. This requires the knowledge of the position of the counter bits within the message, the value of the counter, and the internal ID. After determining the top X CAN IDs by correlation score from Stage 1, the adversary can extract a subtrace consisting of only the messages for that candidate CAN ID. With the subtrace in hand, the adversary calculates the frequency of bit flips for each bit in the subtrace's messages, and matches these flip frequencies to what frequency the bits of a counter should be. This is done using Algorithm 1 shown below.

---
Algorithm 1 Determine Counter Position
--- procedure MATCH-FREQUENCY(flip_freqs, trace_len)
    counter_length ← min(16, $\lceil \log_2$ trace_len$\rceil$)
    counter_positions← [ ]
    for i ← counter_length to 1 do
        match ← argim($\{|f - 2^{-(i-1)}| : f \in$ flip_freqs$\}$)
        APPEND(counter_positions, match)
    return counter_positions Note that only the lowest $\lfloor \log_2(\text{trace length})\rfloor$) bits of the counter can be determined, since these are the only bits that are guaranteed to flip at least once.

After determining the position of the counter bits, the internal ID can be extracted. To do this, the adversary compares consecutive messages in the subtrace, and sees if one of the counter bits flips in the second message. If this occurs, the adversary knows the next lowest bit of the counter must have been a 1 in the first message. Then, to extract the internal ID, the adversary XORs the counter bit with 1. This is repeated until all bits of the internal ID are known. This procedure is summarized in Algorithm 2.

---
Algorithm 2 Determine Internal ID
--- procedure CALCULATE-INT-ID(counter_pos, subtrace)
    c_length ← LENGTH (counter_pos)
    id_length ← min(8, c_length − 1)
    int_id ← [ ]
    offset ← c_length − id_length
    c_pos ← counter_pos[offset : c_length]
    prev_m ← GET(subtrace, 0)
    for i ← 0 to id_length − 1 do
        for m ∈ subtrace do -continued Algorithm 2 Determine Internal ID if m[c_pos[i] ] ≠ prev_m [c_pos[i] ] then
    int_id[i] ← prev_m[c_pos[i+1] ] ⊕ 1
    BREAK
return BITS-TO-INTEGER(int_id)

Now, after obtaining the position of the counter and the internal ID, the attacker can spoof a message. First, they use the encoding determined in Stage 1 to decode the latest message from the desired CAN ID. Next, the attacker replaces the value of the signal they are spoofing with their own fabricated value in that message. Before re-encoding the message with f, the attacker extracts the counter value from the latest real-time message on the CAN bus, increments it by 1, and inserts it into their new message. This spoofed message will then be injected through the adversary's rogue node into the CAN bus and accepted by the respective receiver ECUs.

The recorded traces of all evaluation vehicles were around 60 minutes long. In one embodiment, the above procedure was integrated into an automated CAN message translator, for example as described in U.S. Patent Publication No. 2022/0303305 which is incorporated by reference herein. This new version of the message translator is referred to herein as LibreCAN+—and evaluated its success on those four traces using the ground truth DBC files of each vehicle. The outcome is shown in the last column of the table shown in FIG. 12. The cracking success is dependent on finding the correct CAN ID and encoding in Stage 1 (abbreviated at ST1 in the table) by picking the top candidate in the sorted correlation list, as well as determining the correct internal ID (ID) and counter (cnt). For Vehicles A, B and C, cracking S2-CAN with LibreCAN+ works. Vehicle D already failed in Stage 1 to determine the correct CAN ID for spoofing the desired signal.

Furthermore, how a shorter recording would affect this metric was analyzed. All three stages were re-run with 5%, 10%, 25%, 50% and 75% of full trace length. To avoid bias towards more city or highway driving, the precision for all nonoverlapping segments of this trace were calculated. As can be seen in FIG. 12, traces of 5% and 10% length fail in most cases. The table is color-coded to indicate the number of split traces cracked correctly. If all split traces can be cracked, the traces are highlighted in green. Otherwise, if under ⅔ of split traces are unsuccessful, the traces are highlighted in red, with the remaining portion colored in orange.

FIG. 12 only considers those candidates in Stage 1 with the highest correlation score (X=1) that match the correct encoding and CAN ID as successful. In many cases, it was observed that the second-best candidate was ideal. As a result, we also wanted to see if considering the top X={2, 3, 5, 10} candidates from Stage 1 would lead to success in cracking S2-CAN. If any of the candidates in the top X were correct, ST1 for the respective vehicle and split trace are marked as correct. Based on these, the cracking performance for varying X is summarized n FIG. 13. The values are reported as average numbers over all four vehicles. Note that the color coding is different from the table in FIG. 12. Green cells indicate that the adjacent X value to its right is identical and thus does not provide a performance improvement. Consider using at least a trace of 25% length (15 minutes) and consider the Top 3 candidates for optimal brute-forcing success.

So far, it has been observed that brute-forcing S2-CAN successfully is possible. The total time $t_a$ required by an attacker to crack S2-CAN is the sum of the passive recording time $t_r$, time $t_{st1}$ to crack the encoding in Stage 1, time $tst_2$ to determine the integrity parameters in Stage 2 and time $t_i$ to inject a well-formed CAN message on the CAN bus:

$$t_a = t_r + t_{st1} + t_{st2} + t_i \approx t_r + t_{st1}. \quad (6)$$

This timing analysis shows that the time to determine the two integrity parameters int_ID and cnt on the full trace (60 minutes) takes less than one second. The time to inject the correct CAN message can also occur instantly with minimal network delay from the workstation to the adversary's CAN node (e.g., an Arduino). Hence, $tst_2$ and $t_i$ are negligible and the main contributing factors are $t_r$ and $t_{st1}$.

As shown in FIG. 14, the total time stands at around $t_a=70$ min for full traces (i.e., $t_r=60$ min). Since the threat model stipulates that the attacker can also physically tap into one specific CAN bus (and thus only has access to one bus), LibreCAN+ is run with messages from Bus 1 only. Unfortunately, due to architecture specifics of Vehicle B, all messages are logged on Bus 1, which makes the trace longer and thus affects cracking time. The attacker can only perform a CAN injection attack on a bus equipped with S2-CAN if the session cycle T is larger than $t_a$ since with each new handshake, new parameters will be generated and the attacker has to re-do the entire attack. As a result, S2-CAN is deemed secure if the following condition is met:

$$t_a \approx t_r + t_{st1} > T. \quad (7)$$

An attacker was previously shown to succeed cracking S2-CAN with less passive recording time $t_r$. Since less messages have to be processed, $t_{st1}$ will also be proportionally smaller. With the minimum recording time $t_{r,min}$ to have a successful outcome, one can now set the maximum session cycle $T_{max}$. It was already determined that a trace length of $t_r=15$ minutes is sufficient to succeed. The Top X consideration does not affect the timing since Stage 2's contribution is negligible. If the attacker doesn't achieve the desired outcome (i.e., vehicle malfunction), they can repeat the process with the second and third candidates immediately. For Vehicles A, C and D, $t_{st1}$ stands at less than 3 minutes and for Vehicle B at less than 5 minutes. Hence, the maximum session cycle $T_{max}$ will stand at 18-20 minutes.

Based on the results from the previous section, one can guarantee that S2-CAN is secure if the cycle time T does not exceed 18-20 minutes. The experiments were conducted on a machine with relatively good specs. Nevertheless, a determined attacker can use an even more powerful setup to brute-force S2-CAN faster. The feasibility of such an attack depends on the attacker's incentive, i.e., tradeoff between monetary cost and dedication towards the outcome.

To be flexible, an attacker could rent computational resources online. The main bottleneck of brute-forcing is the time required in Stage 1. Due to multi-threading the combinations, these can be linearly scaled with multiple instances. The cost of running a comparable instance to this experimental setup was obtained from Amazon AWS. Their pricing calculator suggested an on-demand hourly cost of US$1.088 for an EC2 instance with 32 vCPUs and 64 GB RAM. In these experiments, the peak RAM usage stood at 16 GB, but with the configured number of cores, EC2 did not provide any smaller instance. To brute-force S2-CAN with a passive recording time $t_r=15$ minutes in less than 20 seconds, 10 EC2 instances have to be rented. This sums up to a monthly cost of $7,972.40 for the attacker. Given that the attacker only spends $t_a \approx 15$ minutes per attempt (if $T > t_a$), they could conduct 2880 attempts per month at an average cost of $2.77 and still fail, if T is set smaller than the minimum recording time $t_{r,min}$. Although the actual cracking (i.e., $t_{st1}$) can be sped up, $t_{r,min}$ acts as a lower bound to the total attack time $t_a$ and thus the attacker will have no chance of cracking S2-CAN.

Finally, S2-CAN's security is compared with S-CAN approaches. For instance, vatiCAN discusses how long it would take to forge the SHA3-HMAC which depends on the length of the MAC tag. On average, it requires $2^{MAC\_Length-1}$ combinations to brute-force the MAC which is depicted in the last column of the table in FIG. 9. The authors mentioned that it would still take a day to brute-force all combinations on a powerful in-vehicle ECU, but due to their nonce update interval of 50 ms (comparable to our session cycle T), it would be impossible for the attacker to calculate a correct HMAC. Although the same calculation cannot be directly applied to S2-CAN due to lack of MAC and changing position for each CAN message, an online attacker (i.e., on an in-vehicle ECU) would require $$\binom{64}{16} \approx 249$$

combinations to spoof the valid 2-byte integrity parameters which allows a fair comparison with the other numbers in FIG. 9. Given modern GPUs' capabilities, an attacker with similar cost assumptions from above could brute-force S2-CAN in multiple hours due to its 49-bit entropy. Such an attacker would still fail if $T_{max}=15$ minutes.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A secure method for messaging in a vehicle network, comprising:
   establishing a data session on the vehicle network by a given electronic control unit in the vehicle network, wherein establishing the data session includes:
   transmitting, by the given electronic control unit, the encoded data frame over the serial data link, wherein the serial data link is further defined as a controller area network.

2. The method of claim 1 wherein encoding the data frame further comprises applying bit rotation to bits of the payload of the data frame in accordance with value of the encoding parameter, where the encoding parameter specifies number of bits to shift bits in the payload of the data frame.

3. The method of claim 1 wherein encoding the data frame further comprises applying bit rotation to bits of each byte in the payload of the data frame in accordance with the encoding parameters, where the encoding parameters includes a value for each byte of the payload and each value specifies number of bits to shift bits in corresponding byte.

4. The method of claim 1 further comprises
receiving, by the another electronic control unit, the encoded data frame from the given electronic control unit;
decoding, by the another electronic control unit, bit rotation of bits in the payload of the encoded data frame in accordance with value of the encoding parameter;
extracting, by the another electronic control unit, the integrity parameters from the payload of the encoded data frame; and
authenticating, by the another electronic control unit, the encoded data frame using the extracted integrity parameters.

5. The method of claim 4 wherein authenticating the encoded data frame includes comparing the identifier for the given electronic control unit extracted from the encoded data frame with the identifier of the given electronic control unit stored in the memory of the another electronic control unit.

6. The method of claim 5 wherein authenticating the encoded data frame includes comparing the counter value for the given electronic control unit extracted from the encoded data frame with the counter value of the given electronic control unit stored in the memory of the another electronic control unit, and incrementing the counter value stored in the memory of the another electronic control unit when the counter value for the given electronic control unit extracted from the encoded data frame matches the counter value of the given electronic control unit stored in the memory of the another electronic control unit.

7. The method of claim 1 further comprises decrypting the initialization message using a cryptographic key before extracting the encoding parameters therefrom, where the cryptographic key is shared with the gateway.

8. A non-transitory computer-readable medium having computer-executable instructions that, upon execution of the instructions by a processor of a computer, cause the computer to perform:
establishing a data session on the vehicle network by a given electronic control unit in the vehicle network, wherein establishing the data session includes:
receiving, by the given electronic control unit, an initialization message broadcast over a serial data link by a gateway of the vehicle network, where the initialization message includes encoding parameters for encoding data frames;
storing, by the given electronic control unit, the encoding parameters in a memory of the given electronic control unit; and
broadcasting, by the given electronic control unit, an acknowledgement message over the serial data link in response to receiving the initialization message, where the acknowledgement message includes integrity parameters that are associated with the given electronic control unit and the integrity parameters are an identifier for the given electronic control unit, a position at which the identifier is inserted into the payload of the data frame, and a counter value;
receiving, by another electronic control unit, the acknowledgement message from the given electronic control unit;
extracting, by the another electronic control unit, the integrity parameters for the given electronic control unit;
storing, by the another electronic control unit, the integrity parameters for the given electronic control unit in a memory of the another electronic control unit;
broadcasting a data frame across the vehicle network by the given electronic control unit, wherein the broadcasting the data frame includes:
inserting, by the given electronic control unit, the integrity parameters into payload of the data frame;
encoding, by the given electronic control unit, the data frame in accordance with the encoding parameters; and
transmitting, by the given electronic control unit, the encoded data frame over the serial data link, wherein the serial data link is further defined as a controller area network.

9. The non-transitory computer-readable medium of claim 8 wherein encoding the data frame further comprises applying bit rotation to bits of the payload of the data frame in accordance with value of the encoding parameter, where the encoding parameter specifies number of bits to shift bits in the payload of the data frame.

10. The non-transitory computer-readable medium of claim 8 wherein the computer-executable instructions further cause the computer to
receive, by the another electronic control unit, the encoded data frame from the given electronic control unit;
decode, by the another electronic control unit, bit rotation of bits in the payload of the encoded data frame in accordance with value of the encoding parameter;
extract, by the another electronic control unit, the integrity parameters from the payload of the encoded data frame; and
authenticate, by the another electronic control unit, the encoded data frame using the extracted integrity parameters.

11. The non-transitory computer-readable medium of claim 10 wherein authenticating the encoded data frame includes comparing the identifier for the given electronic control unit extracted from the encoded data frame with the identifier of the given electronic control unit stored in the memory of the another electronic control unit.

12. The non-transitory computer-readable medium of claim 11 wherein authenticating the encoded data frame includes comparing the counter value for the given electronic control unit extracted from the encoded data frame with the counter value of the given electronic control unit stored in the memory of the another electronic control unit, and incrementing the counter value stored in the memory of the another electronic control unit when the counter value for the given electronic control unit extracted from the encoded data frame matches the counter value of the given electronic control unit stored in the memory of the another electronic control unit.

* * * * *